United States Patent [19]
Barker et al.

[11] Patent Number: 6,095,737
[45] Date of Patent: Aug. 1, 2000

[54] SHEET METAL ANCHOR NAIL FASTENER WITH LOCKING STAPLE

[75] Inventors: John Rhodes Barker, Warren; Raymond Morrow, Tiverton, both of R.I.

[73] Assignee: ES Products, Bristol, R.I.

[21] Appl. No.: 09/264,132

[22] Filed: Mar. 5, 1999

[51] Int. Cl.[7] .................................................. F16B 15/00
[52] U.S. Cl. .......................... 411/359; 411/448; 411/479; 52/410
[58] Field of Search ........................... 411/356–359, 446, 411/447, 448, 533, 480, 479; 52/410, 712, 506.05

[56] References Cited

U.S. PATENT DOCUMENTS

| | | |
|---|---|---|
| 867,429 | 10/1907 | Simmerman ............................ 411/358 |
| 1,006,468 | 10/1911 | Des Isles ................................ 411/359 |
| 1,039,531 | 9/1912 | Hartley . |
| 1,075,911 | 10/1913 | Gobin . |
| 1,428,111 | 9/1922 | Molesworth . |
| 1,548,456 | 8/1925 | Goodman . |
| 2,457,454 | 12/1948 | Dunlap . |
| 3,003,386 | 10/1961 | Snyder . |
| 4,456,416 | 6/1984 | Schlein . |
| 4,611,964 | 9/1986 | Schlein . |
| 4,655,659 | 4/1987 | Leemke ................................... 411/359 |
| 5,564,876 | 10/1996 | Lat ......................................... 411/487 |

FOREIGN PATENT DOCUMENTS 1363   1/1977   Japan ..................................... 411/448

*Primary Examiner*—Flemming Saether
*Attorney, Agent, or Firm*—Dowell & Dowell, P.C.

[57] ABSTRACT

An anchor nail for use with gypsum and other cementitious or composite materials used in roofing which includes a tapered tubular shank having openings therein through which ends of an insert wire staple are deflected to provide an anchoring for the nail within the material and wherein the legs of the staple are formed so as to prevent fastener withdrawal.

20 Claims, 3 Drawing Sheets

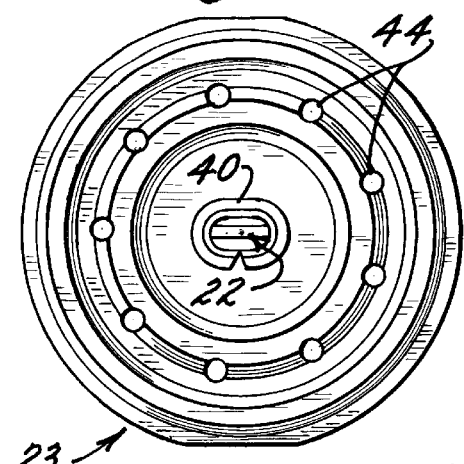
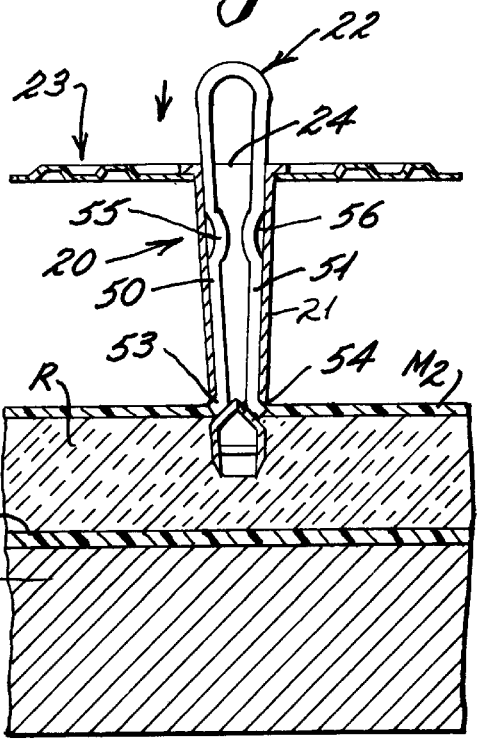
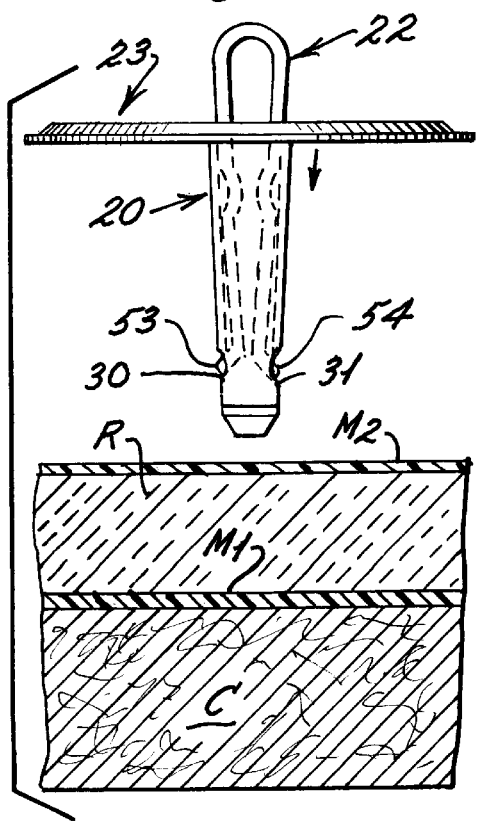
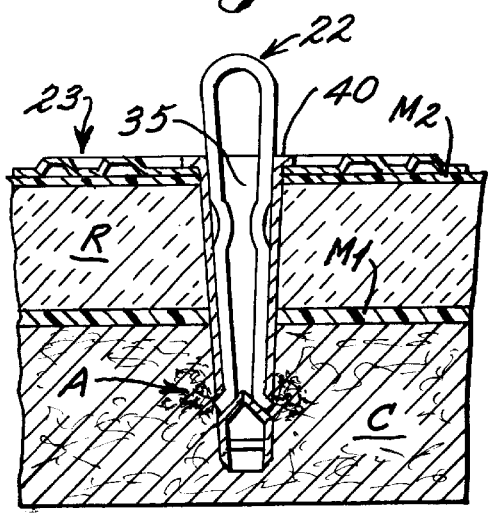

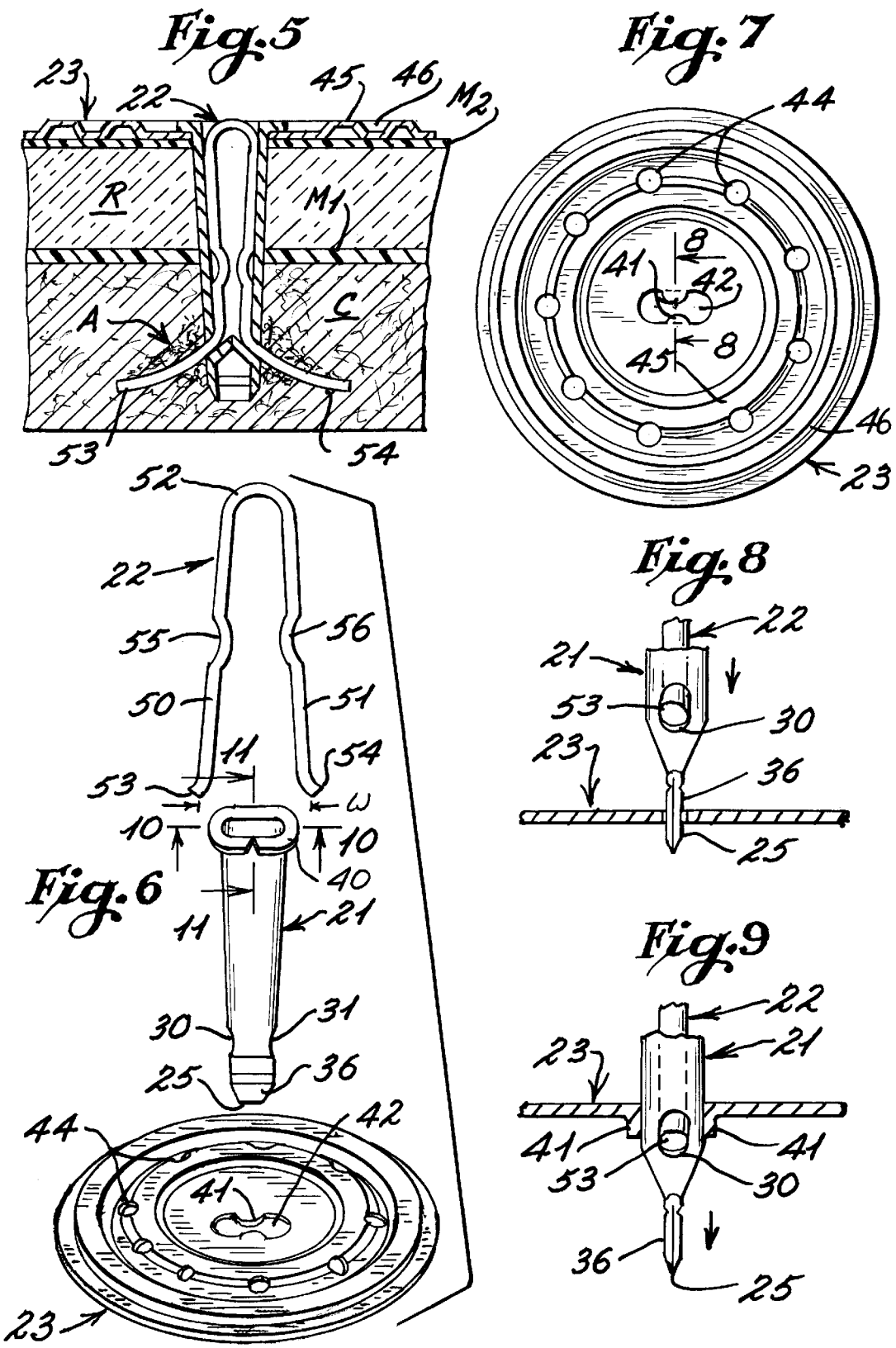

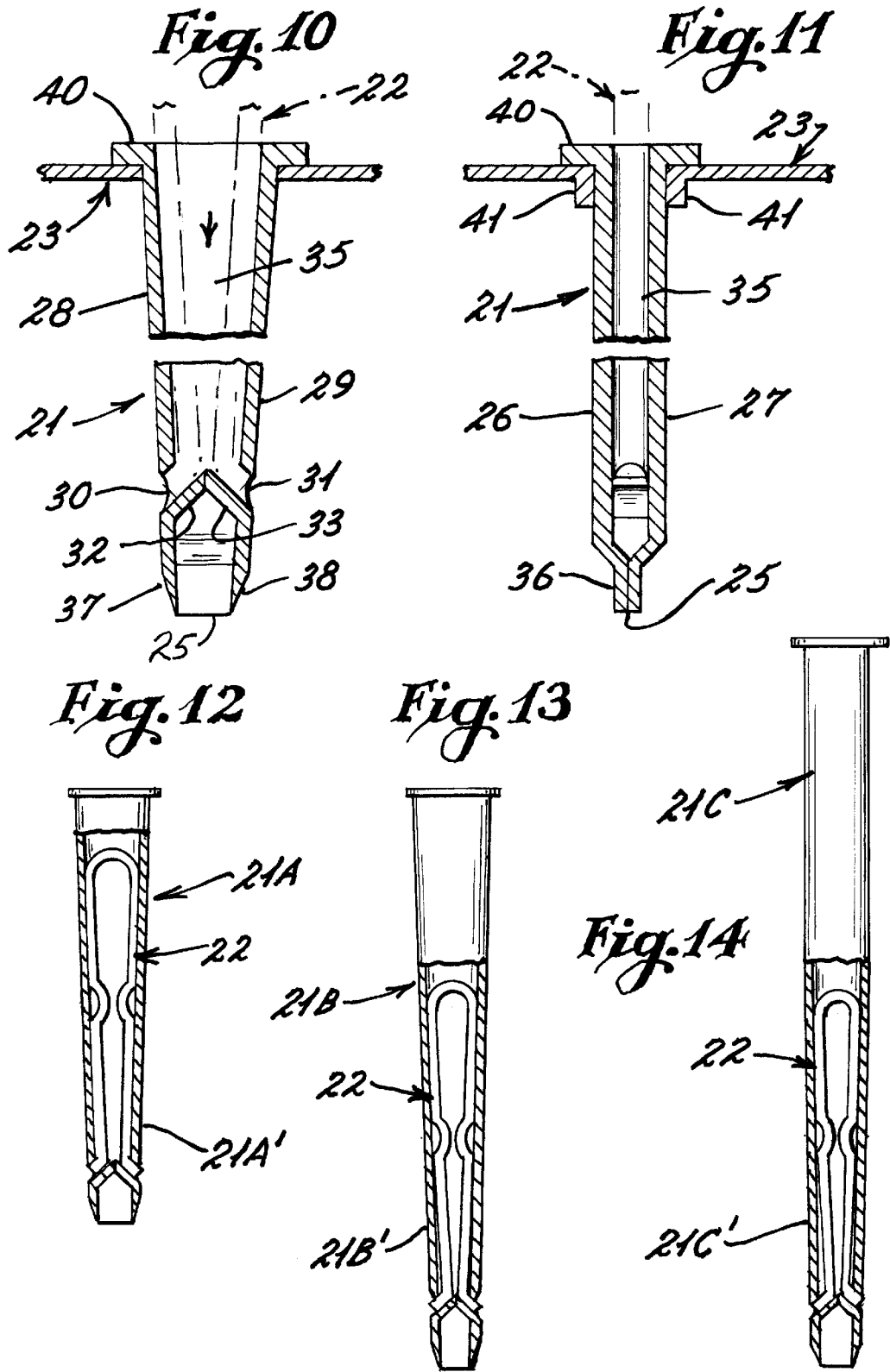

SHEET METAL ANCHOR NAIL FASTENER WITH LOCKING STAPLE

BACKGROUND OF THE INVENTION

1. Field of the Invention

The present invention is directed to fasteners and more specifically to sheet metal fasteners which are designed for use in the roofing industry to secure felt, insulation or roofing membranes to underlying cementitious and/or composite materials such as, but not limited to, gypsum, Tectum® and other fibrous decking. The invention includes a generally hollow tapered compaction shank through which a wire staple is driven to provide an anchor to prevent withdrawal of the fastener once in place.

2. Brief Description of the Related Art

In the roofing industry, and especially in commercial roofing, gypsum, Tectum® light-weight concrete and other cementitious and/or composite materials are utilized to form a roofing deck. In order to make the deck weather resistant, felts, plastics or other types of membranes and insulating materials may be placed over the roofing deck. A recovery board or other material layer may be placed over the materials covering the roof deck composite and are secured thereto utilizing fasteners which are specifically designed to retain the materials to the roof deck material even under high wind conditions. After the fasteners have been installed they may be covered with an asphalt type material or other adhesive or plastic.

Early fasteners utilized in roofing installations included fasteners made of sheet metal having spreadable legs which, when driven into cementitious, composite, or other roof deck material, would deform or deflect relative to one another to thereby capture a plug of the material therebetween. The captured plug resisted back-out or pull-out of the fasteners. To improve the manner in which sheet metal fasteners distributed their holding force to an underlying membrane, fabric or other material layers, such fasteners were modified to include large disks. Such disks serve to distribute the force of the head of the fasteners over a greater area and thus reduce the chance of membrane tears, especially under adverse wind conditions.

In an effort to improve upon the holding resistance of fasteners utilized in the roofing industry, other developments have been made in fasteners which include locking wires. In U.S. Pat. Nos. 4,456,416 and 4,611,964 to Schlein, anchoring nails are disclosed which include a generally cylindrical nail shank which is hollow and which has an opening adjacent the lower end thereof through which a barbed end of an insert wire extends. The barbed end of the wire curves upwardly when driven through the hollow nail shank. In use, the nail shank is initially driven within a roof deck material, after which, the locking wire is driven through the shank such that the end barb hooks outwardly within the material to thereby provide increased anchoring.

Other types of fasteners have been developed utilizing a separate anchoring wire. A screw fastener has been developed which is formed of a nylon material and which includes a generally U-shaped staple locking wire which is driven centrally of the fastener. The wire includes a pair of barbed ends for extending outwardly from adjacent the tip of the fastener when the staple is driven through the fastener. The screw fastener must first be inserted into a decking material which often requires a boring hole to accept the screw. Such structures are disclosed, by way of example, in U.S. Pat. No. 4,655,659 to Leemke.

In the roofing industry, it is critical that fasteners be easily installed with minimum work effort and yet remain rigidly anchored once in place. Any back-out of the fasteners can result in damage to the roof and expensive maintenance problems. In areas where high wind conditions exist, such as in areas where hurricane wind forces can be expected, winds can destroy a roof if the fasteners fail to provide sufficient retention force to secure the roofing materials. For this reason, fasteners utilized in the roofing industry are tested and must be approved for use by regulatory agencies.

Other examples of fasteners which incorporate a generally hollow body through which a wire staple may be driven are disclosed in U.S. Pat. Nos. 1,039,531 to Hartley, 1,075,911 to Gobin, 1,428,111 to Molesworth and 1,548,456 to Goodman. However, such fasteners are not designed for use in the roofing industry.

SUMMARY OF THE INVENTION

This invention is directed to a nail fastener having a body or shank formed of a sheet metal material. The shank is configured as a tapered hollow tube having an open upper end and a flat penetrating end. A pair of opposing openings are provided spaced from the penetrating end through which the outer ends a pair of leg segments of a separate anchoring staple or wire are diverted. In a preferred embodiment the outer ends of the staple are at least partially diverted outwardly through the openings with the assistance of ramp members which are formed by punching the openings in the walls of the tubular shank. The ramp members abut and thus reinforce one another.

The leg segments of the staple include inwardly extending and opposing detents which are formed along their length. The detents engage and bind against one another when the wire staple is driven through the opposing openings of the tubular shank, such that, as the outer ends thereof are deflected outwardly within a material into which the shank is driven, the angle of the legs through the openings in the shank will cause the legs to bind against the shank and thereby provide resistance to back out of the staple or wire, and, in turn resist premature withdrawal of the shank. Each fastener also includes a flange extending outwardly from the tubular shank adjacent the open end thereof which flange engages a disk member which is utilized to distribute the holding force of the fastener throughout a greater area of contact with a membrane or insulation covering the material into which the fastener is driven.

The tubular shank of the present invention is formed of a sheet metal, such as steel, which is coated with a corrosion resistant material such as Galvalume®. The shank tapers inwardly toward the penetrating tip and is designed to compact the material into which it is driven. The wider upper portion of the shank requires a greater driving force to be exerted to seat the shank and this force will cause a greater compaction of the material in the region surrounding the shank where the ends of the locking staple will penetrate the material, thus further increasing the holding capacity of the locking nail.

The hardness of the locking staple may be selected such that, when the staple is seated within the shank, the staple and shank can be simultaneously driven into certain roofing deck materials. The legs of the staple, when inserted within the shank, flex outwardly and thus the ends of the staple will normally seat within the opposing openings in the shank. When driven as a unit, the staple remains seated within the shank until the shank is fully driven, and thereafter, the staple is driven so that the ends thereof extend outwardly through the openings in the shank and into the decking material.

The penetrating tip of the shank is formed such that, along a wide dimension of the tip, two tapers are created in the shank side walls while in the narrower dimension, the tip is bevelled. Such a tip configuration enables the nail to be driven into very dense or built-up roofing without a pre-drilled bore to accept the shank.

It is the primary object of the present invention to provide an anchoring nail type fastener including a separate wire locking staple which may be utilized in the roofing industry to secure membranes, felts, insulation, recovery boards and the like to a cementitious or composite decking material with less tendency of the fastener backing out or becoming loose, even under high wind conditions.

It is a further object of the present invention to form a nail fastener for use in roof deck systems wherein the shank of the nail is formed from a sheet material such that the material may be pre-coated to provide corrosion resistance.

It is also an object of the present invention to provide anchor nail fasteners for use in roof deck systems wherein the nails are formed having a tapered tubular body or shank which compacts the material into which the shank is driven so that a separate anchoring staple or wire fastener will become anchored in a more dense, compacted material when driven through the shank.

It is another object of the present invention to provide an anchoring nail for roof deck systems wherein a hollow nail shank and an internal locking wire staple may be preassembled for use by contractors with the staple being securely seated within the shank prior to the staple being driven to lock the shank in place and which, with less dense roofing materials, permits the shank and staple to be simultaneously driven into the decking material thus reducing installation effort and labor.

BRIEF DESCRIPTION OF THE DRAWINGS

A better understanding of the invention will be had with reference to the drawing figures wherein;

FIG. 1 is a top plan view of the fastener of the present invention.

FIG. 2 is a front illustrational view of the fastener of the present invention showing the hollow, tapered shank of the fastener having a separate wire staple seated therein as the fastener is initially positioned to be driven into a decking material.

FIG. 3 is a front cross-sectional illustrational view of the nail of FIG. 2 showing the nail being initially driven into a roof deck material.

FIG. 4 is a cross-sectional illustrational view similar to FIG. 3 showing the nail shank fully driven into the roof deck material.

FIG. 5 is a view similar to FIG. 4 showing the wire staple wedged and locked into place within the shank of the nail after being deflected into the deck material.

FIG. 6 is an assembly view of the nail of the present invention.

FIG. 7 is a top plan view of the enlarged head or disk utilized with the nail of the present invention.

FIG. 8 is a partial cross-sectional illustrational view taken along line 8—8 of FIG. 7 showing the nail shank prior to positioning through the disk of FIG. 7.

FIG. 9 is a partial cross-sectional illustrational view taken along line 8—8 of FIG. 7 showing the shank penetrating the disk of FIG. 7.

FIG. 10 is an enlarged cross-sectional view of the hollow shank of the nail of the present invention taken along line 10—10 of FIG. 6.

FIG. 11 is an enlarged cross-sectional view of the hollow shank of the nail of the present invention taken along line 11—11 of FIG. 6, and FIGS. 12, 13 and 14 show different sizes of shanks using the locking staple associated with the present invention.

DESCRIPTION OF THE PREFERRED EMBODIMENT

With continued reference to the drawing figures, the sheet metal fastener or nail 20 of the present invention includes three primary components. The fastener includes a hollow tubular nail shank 21 formed of sheet metal, a generally U-shaped locking wire staple 22 and an enlarged disk or head 23, which is also preferably formed of a sheet metal. The tubular shank is shown as being tapered along its length from an open upper end 24 to a penetrating end 25. As shown in FIGS. 9 and 10, the front and rear surfaces of the tubular body 26 and 27 are generally flat and parallel with respect to one another whereas the side walls 28 and 29 are rounded and converge toward the penetrating end 25. In some embodiments the rounded sides taper for between 1.5 and 2.0 inches from the end of the shank toward the penetrating end, and the taper has an included angle of 5 degrees and the included angle should be between 2.5 and 7.0 degrees. This taper improves the withdraw resistance of the fastener because it compacts the substrate material into which it is driven adjacent to the fastener and adds to the denseness of the compacted substrate material. The fastener has increased holding power because the "wedging action" is in a more compacted substrate.

The shank also includes a pair of openings 30 and 31 which are provided adjacent, but spaced from, the penetrating end 25. In the preferred embodiment, the openings are made by punching the openings from the sheet metal material to thereby provide integral deflecting ramps 32 and 33 which extend within a cavity 35 defined within the tubular shank. The ramps abut one another so that they function to reinforce and brace one another. As shown, the openings 30 and 31 are generally in opposing relationship with respect to one another. It should be noted that, in some instances, the ramps may not be provided.

To facilitate penetration of the fastener when in use and to insure the fastener can be driven into very dense and hard asphalt built up roofing, the penetrating end of the fastener has a double taper on the flat sides of the shank and a single taper on the rounded sides of the shank. This triple tapered point is a combination of angles that insures penetration of a very tough section of existing membrane systems, dense insulations, or dense materials contained in a substrate. The penetrating end or tip 25 is shown as being crimped to form a flat blade-like configuration 36 which is beveled at the sides 37 and 38. An integral outwardly extending peripheral flange 40 extends from the upper open end 24 for purposes of engaging a portion of an upper surface of the separate disk or head 23 when the nail is assembled.

With specific reference to FIGS. 2–5, the fastener of the present invention is especially designed for use in roof deck systems which incorporate gypsum, light-weight concrete, Tectum® and other cementitious and composite materials "C". The material "C" is covered with a membrane or felt material "$M_1$", an insulation or recovery board layer "R" and an upper membrane "$M_2$". Prior to being distributed, the fasteners are preferably assembled such that the three major components are secured relative to one another. As shown in FIG. 7, the head or disk 23 includes a central opening 42, having a pair of tabs 41 extending inwardly with respect thereto. As shown in FIGS. 8 and 9, the shank is introduced through the opening 42 and forced downwardly so that the tabs 41 are bent down allowing the shank to be seated within the opening 42. When fully seated with respect to the disk, as shown in FIG. 2, the disk will be essentially locked to the upper portion of the shank with flange 40 of the shank engaging the upper surface of the disk in surrounding relationship with respect to the opening 42. The tabs prevent the withdrawal of the disk relative to the shank. In use, the flange 40 of the shank distributes the force of the fastener or nail over an enlarged area defined by the disk to the underlying membrane and/or recovery board or insulation layers. The disk may include a plurality of openings 44 therein as well as ridges and grooves 45 and 46 for purposes of interlocking with a weather resistant coating applied after the fastener has been installed.

Either prior to or after the disk is mounted relative to the shank, the separate locking staple 22 is inserted within the cavity 35 of the shank and seated as is shown in FIGS. 2–4. The locking staple 22 includes leg elements 50 and 51 which are integrally connected to a head portion 52. Each leg element includes an outer free end 53 and 54, each of which is preferably slightly beveled, barbed or curved outwardly with respect to one another. Each leg element of the staple further includes inwardly extending and oppositely opposing detents 55 and 56 which are provided in order to prevent withdrawal of the staple after it is driven within the tubular shank 21 of the fastener.

The staple is produced from a spring-like material that is able to be pre-formed and yet retain a spring-back force that ensures that the free ends of the staple will locate and snap fit within the exit ports or openings 30 and 31 of the shank when the nail is originally assembled, as is shown in drawing FIGS. 2–4. Although, in the preferred embodiment, the ramp members are provided to initially assist in diverting the free ends of the staple toward the openings 30 and 31, because of the spring like action of the staple, the free ends, when inserted within the cavity 35 of the shank to a point where the free ends align with the openings 30 and 31, will spring out into the opening. Thus, in some embodiments, the ramps 32 and 33 may not be incorporated with the nail.

In addition to the foregoing, the staple must have a hardness which is sufficient to allow the free ends to deform and take a permanent set after being forced through the openings 30 and 31 in the shank as will be discussed in greater detail hereinafter. The staple, to function at a maximum effectiveness, should be of a Rockwell C hardness of between approximately Rc/42 and Rc/56.

The staple 22 is preformed in a U-shaped configuration such that the leg elements 50 and 51 tend to spread apart relative to one another. As shown in FIG. 5, the spacing "W" of the free ends 53 and 54 is preferable approximately three times the distance between the openings 30 and 31 in the shank 21. This distance should be within the range of 2.3 to 4 times the distance between the openings in order to allow a proper snap action fitting of the free ends 53 and 54 of the staple within the openings when the staple is introduced into the shank prior to shipment of the nail. The wire utilized may be, for example, a 0.080 inch diameter high tensile music wire which is coated with tin plating to prevent corrosion.

As further shown in FIG. 5, the free ends of the staple have an approximately 30° outward bend. This degree of outward bend should be between approximately 25° and 45° to facilitate the initial setting of the free ends within the openings of the shank prior to the nail being shipped, such that the nail is in the configuration shown in FIG. 2 of the drawings prior to being shipped. The degree of bend of the free ends relative to the remaining length of the leg segments of the staple will provide additional upward bending action as the staple is forced into a substrate, as is shown in FIG. 5 of the drawing figures.

With reference to FIGS. 2–5, the progressive placement of the nail of the invention is illustrated. In FIG. 2, the nail is shown as preassembled and ready for on-site use. Although it is possible to drive the entire nail with a single driving motion into some substrates utilized with roof deck systems, in most roof deck systems, the nail will be driven in two separate motions. As shown in FIG. 3, the penetrating end of the nail has been shown as initially entering the recovery board "R". As force is applied surrounding the upper end of the staple, the tubular shank having the staple seated therein will be driven to the position shown in FIG. 4 such that the disk engages the upper membrane "$M_2$". In this position, the shank is fully seated within the roof deck material. During the driving of the shank within the material, the shank wedges within the material and compacts the material around the shank making the material more dense in the area thereof as generally indicated at "A". This compaction of the material will provide additional resistance to premature back-out or pull-out of the nail when installed.

Once the shank 21 has been fully seated within the roof deck material, the staple is driven from the position shown in FIG. 4 to the fully extended or deployed position of FIG. 5. As the staple is driven, the free ends 53 and 54 will pass outwardly of the openings 30 and 31 in the shank and into the dense area "A" of the material surrounding the penetrating end of the shank. It should also be noted that the free ends of the staple are shown as extending outwardly, slightly above a horizontal plane defined by the penetrating end of the tubular shank. It is important to ensure that the free ends do not penetrate the material beyond the penetrating end of the tubular shank.

Further, as shown in FIG. 5, the detents 55 and 56 of the leg elements 50 and 51 abut one another when the staple is fully driven relative to the shank. This action creates a binding effect of portions of the leg elements of the staple which extend through the openings 30 and 31 of the tubular shank. Because of the increased angle which is created by the interference fit between the detents, it becomes more difficult to withdraw the staple from the tubular shank. This action, therefore, securely retains the locking nail in place and prevents withdrawal of the staple.

As previously discussed, one of the benefits of the present invention is that the tubular shank 21 is formed of a sheet metal material. The sheet metal may be pre-coated with a corrosion resistant layer such as by galvanizing. A preferred coating is Galvalume®.

With continued reference to FIGS. 12–14, the fasteners of the present invention by be produced in various lengths. Preferably, the lengths are between 1.5 inches to approximately 5.0 inches. The fasteners are manufactured utilizing the tapered configuration as previously discussed. Regardless of the length, the same staple 22 is utilized. Therefore, the staple will be seated at different depths within the various shanks shown at 21, 21A and 21B of FIGS. 12–14. In each, the free ends of the staple are seated within the openings 30 and 31 when the nail is manufactured. As the same staples may be utilized regardless of the length of the shank, the nails of the present invention may be more economically manufactured when compared with prior art locking nails. It should also be noted that, in the preferred embodiment, only the lower portion 21A', 21B' and 21C of each shank is tapered, as previously discussed, and the upper portion of each shank is relatively straight.

The foregoing description of the preferred embodiment of the invention has been presented to illustrate the principles of the invention and not to limit the invention to the particular embodiment illustrated. It is intended that the scope of the invention be defined by all of the embodiments encompassed within the following claims and their equivalents.

What is claimed is:

1. An anchor nail fastener for use with roof deck systems having composite materials comprising;
   a tubular sheet metal shank defining a hollow cavity which extends from an open upper end toward a penetrating end thereof,
   a pair of generally opposing openings in said shank spaced from said penetrating end thereof,
   said shank being formed tapering outwardly from said penetrating end and beyond said opposing openings toward said upper end such that a tapered portion of said shank intermediate said opposing openings and said upper end will compact a composite material in an area adjacent to said opposing openings when said shank is driven into a wedged engagement therein, and
   a generally U-shaped locking staple having bendable leg portions each having a free end of a size to pass through one of said opposing openings in said shank.

2. The anchor nail fastener of claim 1 wherein each of said leg portions includes inwardly oriented and generally opposing bent segments which engage one another as said locking staple is driven into said shank so as to drive said free ends of said leg portions through said opposing openings to thereby inhibit said locking staple from backing out of said cavity through said upper end of said shank.

3. The anchor nail fastener of claim 1 in which said free ends of said locking staple are angled outwardly relative to one another before passing through one of said openings in said shank.

4. The anchor nail fastener of claim 1 in which said sheet metal has been coated to prevent corrosion.

5. The anchor nail fastener of claim 1 including a pair or ramp elements,
   said ramp elements extending inwardly of said cavity adjacent each of said openings so as to provide a guide for deflecting said free ends of said locking staple outwardly through said openings when said locking staple is inserted within said cavity from said upper end of said shank, and said ramp elements being integrally formed with said shank and abutting one another to reinforce one another within said shank.

6. The anchor nail fastener of claim 1 wherein said free ends of said leg portions of said staple are outwardly biased with respect to one another such that said free ends snap fit into said opposing openings when said staple is inserted within said cavity of said shank.

7. The anchor nail fastener of claim 6 wherein each of said leg portions includes inwardly oriented and generally opposing bent segments which engage one another as said locking staple is driven into said shank so as to drive said free ends of said leg portions through said opposing openings to thereby inhibit said locking staple from backing out of said cavity through said upper end of said shank.

8. The anchor nail fastener of claim 6, including an integrally formed peripheral flange extending outwardly of said upper end of said shank.

9. The anchor nail fastener of claim 8, including a disk element having a central opening therethrough, at least one tab element adjacent said opening of a configuration to cooperatively engage said shank when said shank is driven through said central opening of said disk element to thereby retain said disk on said shank.

10. The anchor nail fastener of claim 9 wherein said penetrating end of said body is deformed to define a relatively flat penetrating edge.

11. The anchor nail fastener of claim 10 wherein said flat penetrating edge is beveled on opposite sides thereof.

12. The anchor nail fastener of claim 1 wherein said U-shaped locking staple is formed of a metallic material having a hardness such that when said staple is inserted into said shank, said free ends thereof will automatically engage in said opposing openings in said shank.

13. The anchor nail fastener of claim 12 in which said free ends of said locking staple are angled outwardly relative to one another before being engaged within said opposing openings.

14. The anchor nail fastener of claim 13 in which said staple is coated to prevent corrosion.

15. The anchor nail fastener of claim 1 wherein said staple has a length from an upper portion thereof to said free ends which is less than a distance from said upper open end of said shank to said opposing openings therein.

16. The anchor nail fastener of claim 15 wherein each of said leg portions includes inwardly oriented and generally opposing bent segments which engage one another as said locking staple is driven into said shank so as to drive said free ends of said leg portions through said opposing openings to thereby inhibit said locking staple from backing out of said cavity through said upper end of said shank.

17. An anchor nail fastening system for use with roof decks having composite materials comprising;
   a plurality of tubular sheet metal shanks of separate lengths, each shank defining a hollow cavity which extends from an open upper end toward a penetrating end thereof,
   a pair of generally opposing openings in each shank spaced from said penetrating end thereof,
   each shank tapering outwardly from said penetrating end and beyond said opposing openings toward said upper and such that a tapered portion of said shank intermediate said opposing openings and said upper end will compact a composite material in an area adjacent to said opposing openings when said shank is driven into a wedged engagement therein,
   a plurality of generally U-shaped locking staples of substantially the same size and configuration and each having bendable leg portions having a free end of a size to pass through one of said opposing openings in one of said shanks, and
   each of said leg portions including inwardly oriented and generally opposing bent segments which engage one another as one of said locking staple is driven into one of said shanks so as to drive said free ends of said leg portions through said opposing openings to thereby inhibit said locking staple from backing out of said cavity through said upper end of said shank.

18. An anchor nail fastener for use with roof deck systems having composite materials comprising;
   a tubular shank defining a hollow cavity which extends from an open upper end toward a penetrating end thereof, a pair of generally opposing openings in said shank spaced from said penetrating end,
   said shank tapering outwardly from said penetrating end and beyond said opposing openings toward said upper end such that a tapered portion of said shank intermediate said opposing openings and said upper end will compact a composite material in an area adjacent to said opposing openings when said shank is driven into a wedged engagement therein, a generally U-shaped locking staple having bendable leg portions each having a free end of a size to pass through one of said opposing openings in said shank, and each of said leg portions including inwardly oriented and generally opposing bent segments which engage one another as said locking staple is driven into said shank so as to drive said free ends of said leg portions through said opposing openings and to thereby inhibit said locking staple from backing out of said cavity through said upper end of said shank.

19. The anchor nail fastener of claim 18 wherein said free ends of said leg portions of said staple are outwardly biased with respect to one another such that said free ends snap fit into said opposing openings when said staple is inserted within said cavity of said shank.

20. The anchor nail fastener of claim 19 wherein said staple has a length from an upper portion thereof to said free ends which is less than a distance from said upper open end of said shank to said opposing openings therein.

* * * * *